(12) United States Patent
He et al.

(10) Patent No.: US 10,460,171 B2
(45) Date of Patent: Oct. 29, 2019

(54) SYSTEMS AND METHODS FOR PROCESSING MEDIA CONTENT THAT DEPICT OBJECTS

(71) Applicant: Facebook, Inc., Menlo Park, CA (US)

(72) Inventors: Rujia He, Mountain View, CA (US); William M. Ruben, San Francisco, CA (US); Laura Javier, Palo Alto, CA (US); Ashwin Bharambe, Sunnyvale, CA (US); Lide Zhang, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 12 days.

(21) Appl. No.: 15/253,724

(22) Filed: Aug. 31, 2016

(65) Prior Publication Data

US 2018/0060659 A1 Mar. 1, 2018

(51) Int. Cl.
*G06K 9/00* (2006.01)

(52) U.S. Cl.
CPC ........... *G06K 9/00671* (2013.01); *G06K 9/00* (2013.01); *G06K 9/00255* (2013.01); *G06K 9/00288* (2013.01); *G06K 2009/00328* (2013.01); *G06K 2209/27* (2013.01)

(58) Field of Classification Search
CPC ........... G06K 9/00671; G06K 9/00255; G06K 9/00288; G06K 9/00268
USPC ........................................................ 382/103
See application file for complete search history.

(56) References Cited

U.S. PATENT DOCUMENTS

| | | | |
|---|---|---|---|
| 7,602,968 B2* | 10/2009 | Kokemohr | G06F 3/04845 382/162 |
| 9,792,708 B1* | 10/2017 | Hyde-Moyer | G06T 11/60 |
| 9,839,356 B2* | 12/2017 | Kaib | A61B 5/0022 |
| 2009/0232354 A1* | 9/2009 | Camp, Jr. | G06Q 30/02 382/103 |
| 2012/0105317 A1* | 5/2012 | Oka | H04M 1/0202 345/156 |
| 2013/0155307 A1* | 6/2013 | Bilbrey | G06F 1/1694 348/333.01 |
| 2013/0194438 A1* | 8/2013 | Sweet, III | G06K 9/00221 348/207.1 |
| 2014/0363098 A1* | 12/2014 | Feng | G06T 11/60 382/284 |
| 2016/0005189 A1* | 1/2016 | Gray | G06K 9/00456 345/633 |

(Continued)

Primary Examiner — Van D Huynh
(74) Attorney, Agent, or Firm — Sheppard Mullin Richter & Hampton LLP

(57) ABSTRACT

Access to a set of media content items is acquirable. Identified processors can perform, in parallel, object detection for the set. In some cases, information about a current system state, a user, and/or object popularity metrics is acquirable for selecting a subset of object models. Object recognition is performable, based on the subset, for the set of media content items. In some instances, a camera view can be provided. Object recognition is performable for representations of the view. An object depicted in the representations is identifiable. An interface portion is presentable to provide a label for the object. In some cases, object recognition is performable for the set of media content items to identify an object depicted in a content item. A label is associable with the content item. A search through the set of media content items can identify, based on the label, a subset that depicts the object.

20 Claims, 15 Drawing Sheets

(56) References Cited

U.S. PATENT DOCUMENTS

| | | | |
|---|---|---|---|
| 2016/0127654 A1* | 5/2016 | Kraft | G06T 19/006 |
| | | | 348/239 |
| 2017/0116786 A1* | 4/2017 | Ramkumar | G06F 15/16 |
| 2017/0279997 A1* | 9/2017 | Ozawa | H04N 1/00925 |
| 2017/0308268 A1* | 10/2017 | Chiba | G01C 21/3664 |
| 2018/0041594 A1* | 2/2018 | Qi | H04L 51/32 |

* cited by examiner

SYSTEMS AND METHODS FOR PROCESSING MEDIA CONTENT THAT DEPICT OBJECTS

FIELD OF THE INVENTION

The present technology relates to the field of multimedia or media content processing. More particularly, the present technology relates to techniques for processing media content that depict objects.

BACKGROUND

Today, people often utilize computing devices (or systems) for a wide variety of purposes. Users can use their computing devices to, for example, interact with one another, access content, share content, and create content. In some cases, users can utilize their computing devices to download, view, or otherwise access media content. For instance, users of a social networking system (or service) can, via their computing devices, access their feeds or other users' profiles to view various posts that include media content items, such as images. In another instance, users can utilize their computing devices to view or access images via web resources, such as webpages, websites, or online applications.

In some cases, media content items can include, represent, or depict objects, such as faces of users, pets, products, logos, landmarks, or text. Under conventional approaches specifically arising in the realm of computer technology, a media content item such as an image can be processed in attempt to detect or recognize any objects depicted, represented, or included therein. However, conventional approaches can be inefficient. As such, conventional approaches can create challenges for or reduce the overall experience associated with utilizing media content such as images.

SUMMARY

Various embodiments of the present disclosure can include systems, methods, and non-transitory computer readable media configured to acquire access to a set of media content items. A plurality of processors can be identified. Each processor in the plurality of processors can be utilized, in parallel, to perform object detection with respect to a respective media content item in the set of media content items.

In an embodiment, it can be determined that object detection has yet to be performed with respect to at least some media content items in the set of media content items. It can be determined that a particular processor in the set of processor has completed performing object detection with respect to a particular media content item in the set of media content items. The particular processor can be utilized to perform object detection with respect to a first media content item out of the at least some media content items.

In an embodiment, recency data can be acquired for the set of media content items. The set of media content items can be sorted based on the recency data to produce an order in which object detection is to be performed with respect to the set of media content items. The order can be from most recent to least recent.

In an embodiment, it can be detected that a user of a computing system is accessing a particular media content item in the set of media content items. The set of media content items can be sorted such that the particular media content item is prioritized over at least one other media content item when object detection is performed with respect to the set of media content items.

In an embodiment, it can be determined that a particular media content item out of the set of media content items corresponds to at least one of a screenshot, a selfie image, or an image from a third-party application. Object detection can be prevented from being performed with respect to the particular media content item.

In an embodiment, object detection can be performed with a lower central processing unit (CPU) priority than at least one other operation performed by the computing system.

In an embodiment, object detection performed with respect to the respective media content item can identify a portion of the respective media content item in which a detected object is depicted.

In an embodiment, the portion of the respective media content item can be transmitted to a server configured to perform object recognition with respect to the portion of the respective media content item.

In an embodiment, object detection can include face detection.

Moreover, various embodiments of the present disclosure can also include systems, methods, and non-transitory computer readable media configured to acquire information associated with at least one of a current state of a computing system, a user of the computing system, or object popularity metrics. The information can be enabled to be utilized to select a subset of object models out of a set of object models. The subset of object models can be acquired. Object recognition can be performed, based on the subset of object models, with respect to a set of media content items.

In an embodiment, it can be determined that the user has acquired at least a specified threshold quantity of media content items that depict a particular object. It can be determined that a particular object model for the particular object is yet to be included in the subset of object models. The particular object model can be selected for inclusion in the subset of object models.

In an embodiment, the subset of object models can be selected such that each object model in the subset has a respective object popularity metric that at least satisfies a specified object popularity threshold.

In an embodiment, the set of object models can be stored remotely from the computing system. The subset of object models can be stored locally at the computing system subsequent to being acquired. Object recognition can be performed, based on the subset of object models, with respect to the set of media content items occurs locally at the computing system.

In an embodiment, the current state of the computing system can indicate at least one of a time or a location. The subset of object models can be selected based on at least one of the time or the location.

In an embodiment, the subset of object models can be selected such that each object model in the subset has at least a threshold likelihood confidence value of being associated with the location.

In an embodiment, the information associated with at least one of the current state of the computing system, the user of the computing system, or the object popularity metrics can include historical data associated with one or more interactions performed by the user via the computing system. The subset of object models can be selected based on the historical data.

In an embodiment, the information associated with at least one of the current state of the computing system, the user of the computing system, or the object popularity metrics can include social data associated with the user. The subset of object models can be selected based on the social data associated with the user.

In an embodiment, the social data can indicate one or more social connections that each have at least a threshold social coefficient value with respect to the user. At least some object models in the subset of object models can be selected based on one or more object models associated with the one or more social connections.

In an embodiment, each object model in the set of object models can have been trained for utilization during object recognition to identify a respective object with which each object model is associated.

Furthermore, various embodiments of the present disclosure can also include systems, methods, and non-transitory computer readable media configured to provide a live camera view for a camera of a computing system. Object recognition can be performed, as one or more background processes, with respect to one or more representations of the live camera view. At least one object depicted in the one or more representations of the live camera view can be identified. An interface portion overlaying the live camera view can be presented. The interface portion can provide at least one label for the at least one object.

In an embodiment, a first command to acquire a first image represented via the live camera view at a first time can be received. The at least one object can be depicted in the first image. The at least one object can include a first face associated with a first recognized user. The at least one label can include a first identifier for the first recognized user. The at least one label can be stored as metadata for the first image. An option to share the first image with the first recognized user can be provided.

In an embodiment, a second command to acquire a second image represented via the live camera view at a second time can be received. It can be determined that a second face associated with a second recognized user is depicted in the second image. A second identifier for the second recognized user can be provided via the interface portion.

In an embodiment, it can be determined that the first time and the second time are within a specified allowable time deviation from each other. Both the first image and the second image can be enabled to be shared with both the first recognized user and the second recognized user.

In an embodiment, a first location associated with the first image can be identified. A second location associated with the second image can be identified. It can be determined that the first location and the second location are within a specified allowable proximity from each other. Both the first image and the second image can be enabled to be shared with both the first recognized user and the second recognized user.

In an embodiment, an option to edit the at least one label for the at least one object can be provided.

In an embodiment, an option to hide the at least one label for the at least one object can be provided.

In an embodiment, the at least one label can be dynamically provided in real-time via the interface portion.

In an embodiment, the one or more representations can include one or more images represented via the live camera view at one or more different times.

In an embodiment, the live camera view can be associated with a default camera application.

Additionally, various embodiments of the present disclosure can also include systems, methods, and non-transitory computer readable media configured to acquire access to a set of media content items. Object recognition can be enabled to be performed with respect to the set of media content items to identify at least one object depicted in at least one media content item out of the set of media content items. At least one label can be associated with the at least one media content item. The at least one label can correspond to at least one of an identifier, a topic, or a classification for the at least one object. A search through the set of media content items can be enabled, based on an input indicating the at least one label, to identify a subset of media content items that depict the at least one object. A user associated with the input can be provided with access to the subset of media content items that depict the at least one object.

In an embodiment, a user associated with the input can have permission to access the set of media content items.

In an embodiment, at least some media content items can be stored locally at a computing system. The search through the set of media content items can be performed, at least in part, locally at the computing system.

In an embodiment, the at least some media content items can include one or more images from a local image collection at the computing system.

In an embodiment, at least some media content items can be stored remotely from the computing system. The search through the set of media content items can be performed, at least in part, remotely from the computing system.

In an embodiment, object recognition can be performed, locally at the computing system, with respect to at least some media content items in the set of media content items.

In an embodiment, object recognition can be performed, remotely from the computing system, with respect to at least some media content items in the set of media content items.

In an embodiment, at least some media content items in the subset of media content items can have already been previously associated with the at least one label.

In an embodiment, at least some media content items in the set of media content items can have already been manually labeled.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
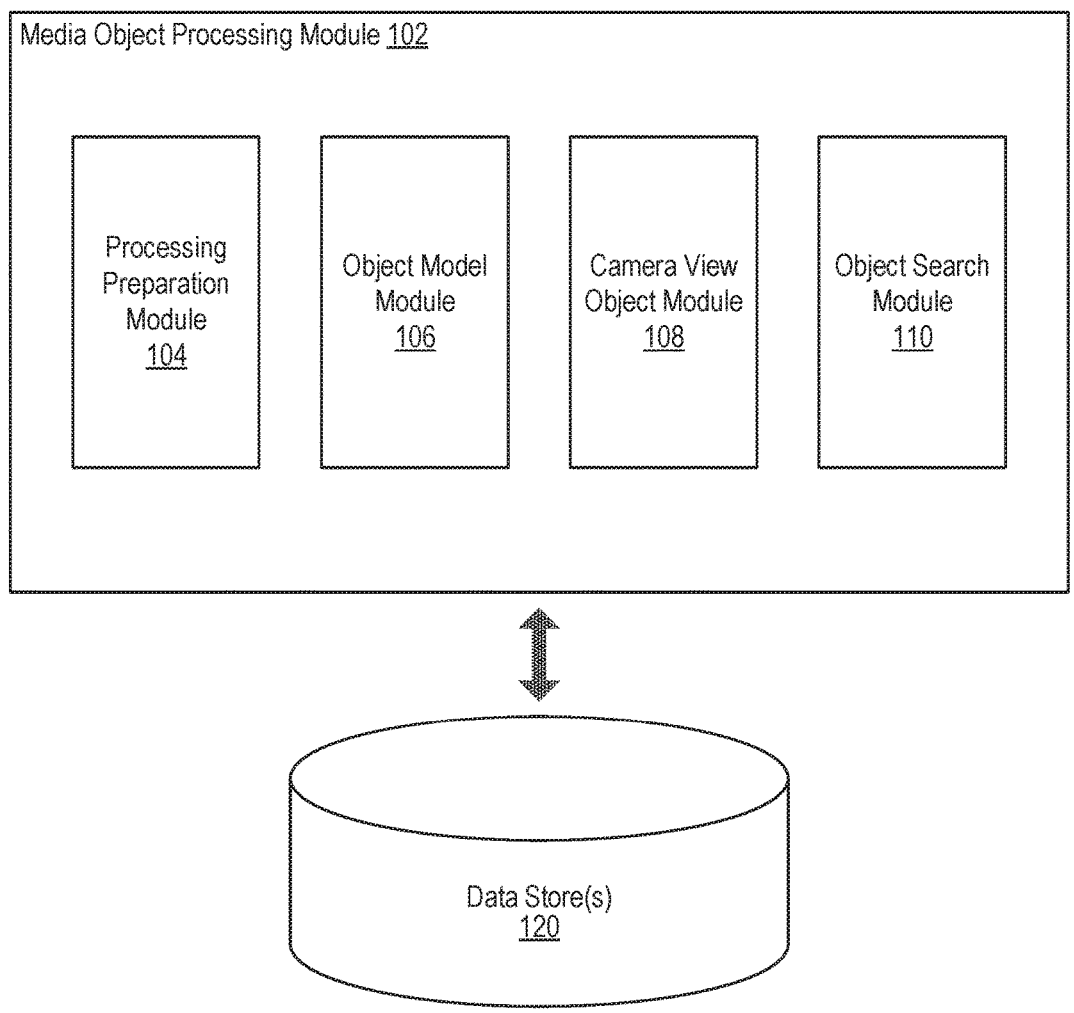
FIG. 1 illustrates an example system including an example media object processing module configured to facilitate processing media content that depict objects, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Processing Media Content that Depict Objects

People use computing systems (or devices) for various purposes. Users can utilize their computing systems to establish connections, engage in communications, interact with one another, and/or interact with various types of content. In some cases, a user of a computing device can access multimedia or media content. For example, the user can utilize his or her computing device to access a social networking system (or service). In this example, the user can acquire, view, or otherwise interact with a media content item, such as an image, via the user's newsfeed, via pages associated with other entities, and/or via profiles associated with other users of the social networking system. In another example, the user can view or access images (including videos or sets of video image frames) via various resources, such as webpages, websites, applications, and/or local albums, etc.

Under conventional approaches specifically arising in the realm of computer technology for media processing, often times media content items such as images are transmitted in their full file sizes from client computing devices to servers where processing is performed. However, conventional approaches that transmit images in full and that perform image processing at the servers can be inefficient, inconvenient, or costly. Moreover, in some cases, media processing such as object recognition in images performed in accordance with conventional approaches may rely completely on the servers. Accordingly, such media processing which requires transmission of media content items to be processed remotely at the servers can require significant amounts of time and server computational resources. Furthermore, in some instances, when a user is attempting to record, capture, or otherwise acquire a media content item such as an image, conventional approaches can be uninteresting or not significantly interactive. Additionally, in some cases, browsing or searching through a plurality of media content items such as images can be inconvenient or inefficient under conventional approaches.

Due to these or other concerns, conventional approaches specifically arising in the realm of computer technology can be disadvantageous or problematic. Therefore, an improved approach rooted in computer technology that overcomes the foregoing and other disadvantages associated with conventional approaches can be beneficial. Based on computer technology, the disclosed technology can facilitate processing media content that depict objects. Various embodiments of the present disclosure can include systems, methods, and non-transitory computer readable media configured to acquire access to a set of media content items. A plurality of processors can be identified. Each processor in the plurality of processors can be utilized, in parallel, to perform object detection with respect to a respective media content item in the set of media content items.

In some embodiments, information associated with at least one of a current state of a computing system, a user of the computing system, or object popularity metrics can be acquired. The information can be enabled to be utilized to select a subset of object models out of a set of object models. The subset of object models can be acquired. Object recognition can be performed, based on the subset of object models, with respect to a set of media content items.

In some embodiments, a live camera view for a camera of a computing system can be provided. Object recognition can be performed, as one or more background processes, with respect to one or more representations of the live camera view. At least one object depicted in the one or more representations of the live camera view can be identified. An interface portion overlaying the live camera view can be presented. The interface portion can provide at least one label for the at least one object.

In some embodiments, access to a set of media content items can be acquired. Object recognition can be enabled to be performed with respect to the set of media content items to identify at least one object depicted in at least one media content item out of the set of media content items. At least one label can be associated with the at least one media content item, the at least one label corresponding to at least one of an identifier, a topic, or a classification for the at least one object. A search through the set of media content items can be enabled, based on an input indicating the at least one label to identify a subset of media content items that depict the at least one object. It is contemplated that there can be many variations and/or other possibilities associated with the disclosed technology.

FIG. 1 illustrates an example system 100 including an example media object processing module 102 configured to facilitate processing media content that depict objects, according to an embodiment of the present disclosure. As shown in the example of FIG. 1, the media object processing module 102 can include a processing preparation module 104, an object model module 106, a camera view object module 108, and an object search module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the media object processing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the media object processing module 102 can be implemented, in part or in whole, as software running on one or more computing devices or systems, such as on a user or client computing device. For example, the media object processing module 102 or at least a portion thereof can be implemented as or within an application (e.g., app), a program, an applet, or an operating system, etc., running on a user computing device or a client computing system, such as the user device 610 of FIG. 6. In another example, the media object processing module 102 or at least a portion thereof can be implemented using one or more computing devices or systems that include one or more servers, such as network servers or cloud servers. In some instances, the media object processing module 102 can, in part or in whole, be implemented within or configured to operate in conjunction with a social networking system (or service), such as the social networking system 630 of FIG. 6. It should be appreciated that there can be many variations or other possibilities.

The processing preparation module 104 can be configured to facilitate acquiring access to a set of media content items. A plurality of processors can be identified. Each processor in the plurality of processors can be utilized, in parallel, to perform object detection with respect to a respective media content item in the set of media content items. More details regarding the processing preparation module 104 will be provided below with reference to FIG. 2A.

In addition, the object model module 106 can be configured to facilitate acquiring information associated with at least one of a current state of a computing system, a user of the computing system, or object popularity metrics. The information can be enabled to be utilized to select a subset of object models out of a set of object models. The subset of object models can be acquired. Object recognition can be performed, based on the subset of object models, with respect to a set of media content items. The object model module 106 will be discussed in more detail below with reference to FIG. 3A.

Moreover, the camera view object module 108 can be configured to facilitate providing a live camera view for a camera of the computing system. Object recognition can be performed, as one or more background processes, with respect to one or more representations of the live camera view. At least one object depicted in the one or more representations of the live camera view can be identified. An interface portion overlaying the live camera view can be presented. The interface portion can provide at least one label for the at least one object. More details regarding the camera view object module 108 will be provided below with reference to FIG. 4A.

Furthermore, the object search module 110 can be configured to facilitate acquiring access to a set of media content items. Object recognition can be enabled to be performed with respect to the set of media content items to identify at least one object depicted in at least one media content item out of the set of media content items. At least one label can be associated with the at least one media content item. The at least one label can correspond to at least one of an identifier, a topic, or a classification for the at least one object. A search through the set of media content items can be enabled, based on an input indicating the at least one label, to identify a subset of media content items that depict the at least one object. The object search module 110 will be discussed in more detail below with reference to FIG. 5A.

Additionally, in some embodiments, the media object processing module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the media object processing module 102. Again, it is contemplated that there can be many variations or other possibilities associated with the disclosed technology.

Figure 2A:
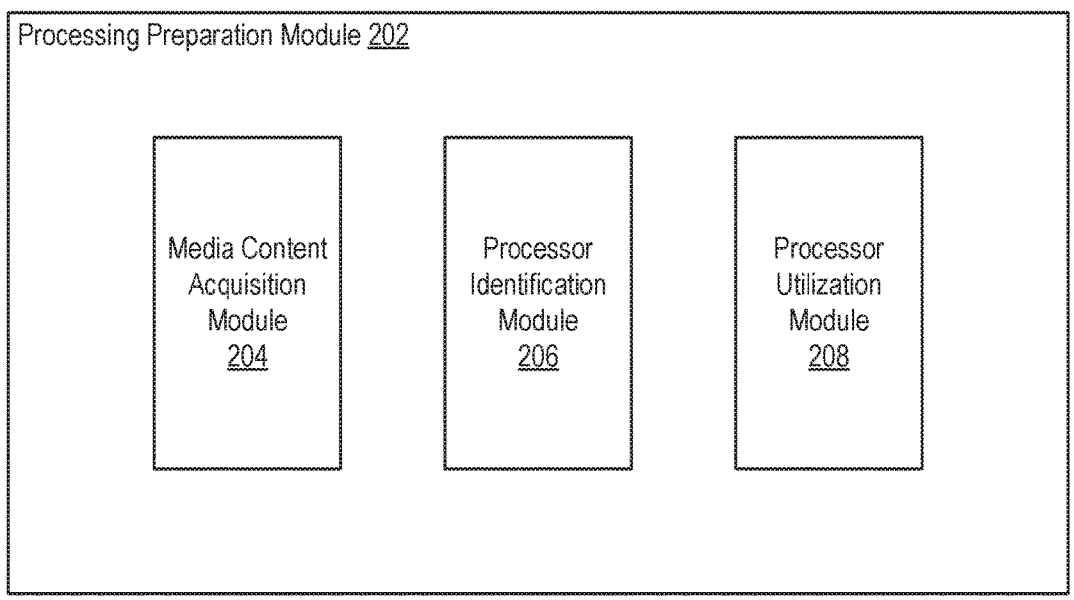
FIG. 2A illustrates an example processing preparation module configured to facilitate processing media content that depict objects, according to an embodiment of the present disclosure.

FIG. 2A illustrates an example processing preparation module 202 configured to facilitate processing media content that depict objects, according to an embodiment of the present disclosure. In some embodiments, the processing preparation module 104 of FIG. 1 can be implemented as the processing preparation module 202. As shown in the example of FIG. 2A, the processing preparation module 202 can include a media content acquisition module 204, a processor identification module 206, and a processor utilization module 208.

As discussed previously, the processing preparation module 202 can be configured to facilitate acquiring (e.g., retrieving, receiving, etc.) access to a set of media content items. In some embodiments, the processing preparation module 202 can utilize the media content acquisition module 204 to facilitate acquiring access to the set of media content items. The media content acquisition module 204 can acquire media content items such as images (including video image frames which can form videos). In one example, the media content acquisition module 204 can acquire media content items existing within a local media library, image collection, and/or camera roll of a computing system (or device). In another example, the media content acquisition module 204 can acquire media content items that are newly captured, recorded, and/or downloaded at the computing system. In a further example, the media content acquisition module 204 can acquire media content items that are selected, such as based on one or more user selections. It should be appreciated that all examples herein are provided for illustrative purposes and that there can be many variations or other possibilities associated with the disclosed technology.

The processing preparation module 202 can also be configured to facilitate identifying a plurality of processors, as discussed above. The processing preparation module 202 can utilize the processor identification module 206 to identify the plurality of processors. In some cases, the processor identification module 206 can identify all processors of the computing system, such as those processor present within the computing system. For example, if a smartphone has dual processors, then the processor identification module 206 can determine that the plurality of processors at the smartphone includes two processors. In another example, if a tablet computer has quad processors, then the processor identification module 206 can determine that the plurality of processors at the tablet computer includes four processors. Further, in some cases, the processor identification module 206 can identify only those processors of the computing system that are available or that are capable of handling one or more specified computing operations/tasks.

Moreover, the processor utilization module 208 can be configured to facilitate utilizing, in parallel, each processor in the plurality of processors to perform object detection with respect to a respective media content item in the set of media content items. In some implementations, object detection performed with respect to the respective media content item can identify a portion of the respective media content item in which a detected object is depicted. In one example, object detection can include face detection and the detected object can correspond to a detected face (i.e., a detected face object) depicted in an identified portion of an image. In some cases, the identified portion of the respective media content item can be transmitted to a server configured to perform object recognition with respect to the portion of the respective media content item. Continuing with the previous example, the processing preparation module 202 can facilitate transmitting the identified image portion that depicts the detected face to the server where face recognition can be performed with respect to the identified image portion to recognize a user associated with the detected face.

In some embodiments, image classification analysis can be performed on content items to determine their potential relevance with a particular subject, topic, and/or theme. The classification analysis can be based on myriad techniques, for example. Content items constituting or including images or text can be analyzed and classified based on any suitable processing technique. For example, an image classification technique can gather contextual cues for a sample set of images and use the contextual cues to generate a training set of images. The training set of images can be used to train a classifier to generate visual pattern templates of an image class. The classifier can score an evaluation set of images based on correlation with the visual pattern templates. The highest scoring images of the evaluation set of images can be deemed to be mostly closely related to the image class. As another example, a hint detection technique can include natural language processing (NLP) to assist in identifying hints in comments (if any) associated with an image. The NLP-based hint detection technique can identify, based at least in part on natural language processing, one or more tokens in a comment that can assist in determining the subject matter of an image. Other suitable techniques are possible.

In some embodiments, a first quantity associated with the set of media content items is greater than a second quantity associated with the plurality of processors. The processing preparation module 202 can, at some point, determine that object detection has yet to be performed with respect to at least some media content items in the set of media content items. The processor identification module 206 can determine that a particular processor in the set of processor has completed performing object detection with respect to a particular media content item in the set of media content items (and thus is available). The processor utilization module 208 can cause the particular processor to be utilized for performing object detection with respect to a first media content item out of the at least some media content items. For instance, there can be 100 images included in the set of media content items and four processors in the plurality of processors. In this instance, the processor identification module 206 can determine that the first of the four processors has completed performing object detection with respect to the first of the 100 images. The processor utilization module 208 can cause the first processor to then be utilized for performing object detection with respect to the fifth image out of the 100 images. This approach can be repeated for the plurality of processors and the rest of the 100 images. Again, all examples herein are provided for illustrative purposes and many variations associated with the disclosed technology are possible.

Furthermore, in some implementations, the media content acquisition module 204 can acquire recency data for the set of media content items. For instance, the recency data can indicate when or how recently each media content item was captured, recorded, taken, and/or downloaded, etc. The set of media content items can be sorted based on the recency data to produce an order in which object detection is to be performed with respect to the set of media content items. For example, the order can be from most recent to least recent, or vice versa.

In some embodiments, the processing preparation module 202 can detect that a user of the computing system is accessing (e.g., viewing, interacting with, etc.) a particular media content item in the set of media content items. The set of media content items can then be sorted such that the particular media content item is prioritized over at least one other media content item when object detection is performed with respect to the set of media content items.

Moreover, in some instances, the processing preparation module 202 can determine that a particular media content item out of the set of media content items corresponds to at least one of a screenshot, a selfie image, or an image from a third-party application. The processing preparation module 202 can prevent object detection from being performed with respect to the particular media content item. For example, the processing preparation module 202 can filter out screen-capture images, selfies, or images saved from third-party apps.

Furthermore, in some cases, object detection can be performed with a lower central processing unit (CPU) priority than at least one other operation performed by the computing system. For example, object detection can have a lower CPU priority than a scrolling operation on the computing system, such that any lag is reduced or eliminated for the scrolling operation. As discussed, many variations are possible.

Figure 2B:
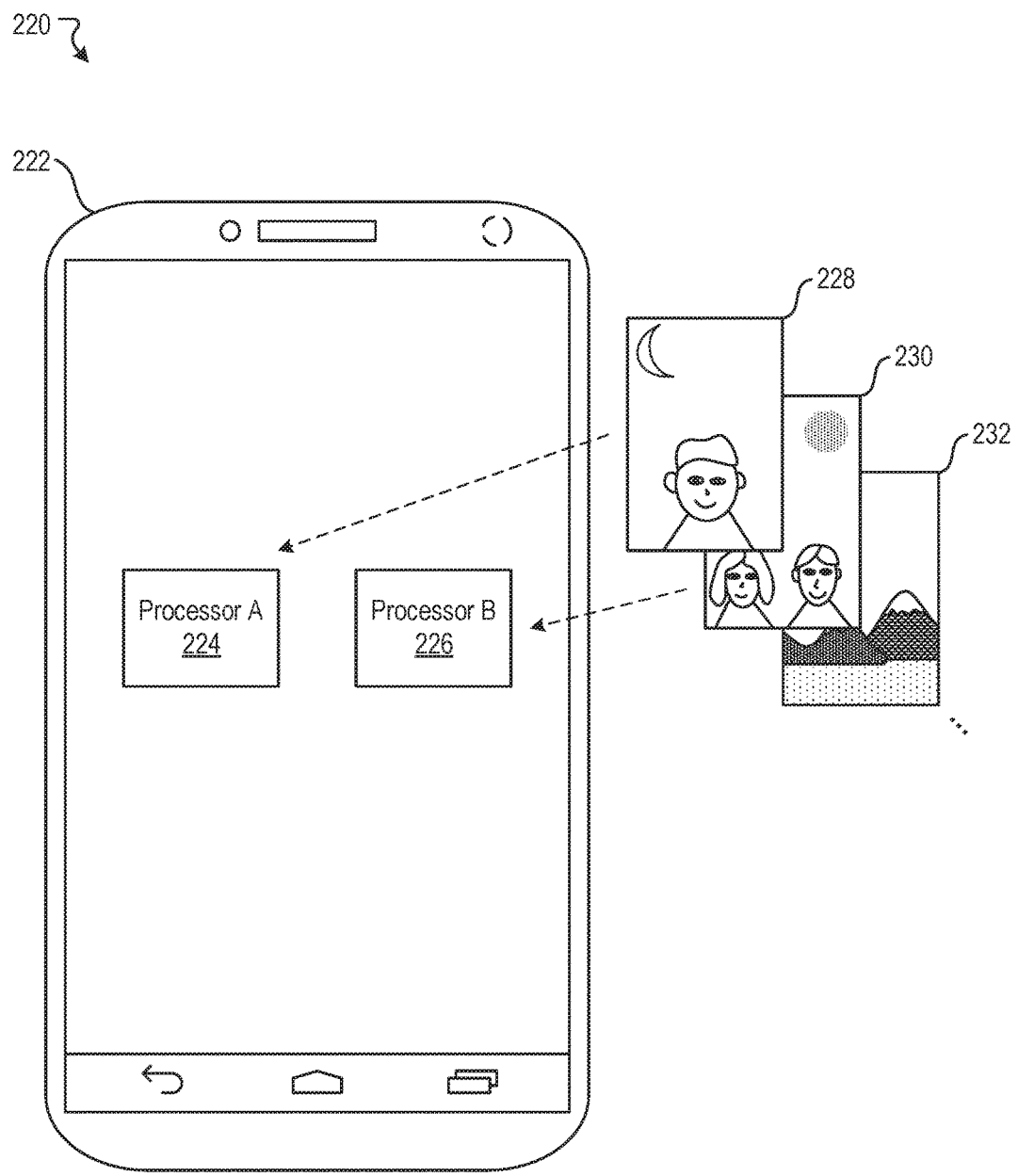
FIG. 2B illustrates an example scenario associated with processing media content that depict objects, according to an embodiment of the present disclosure.

FIG. 2B illustrates an example scenario 220 associated with processing media content that depict objects, according to an embodiment of the present disclosure. The example scenario 220 illustrates an example computing system (or device) 222. In this example scenario 220, the disclosed technology can determine that the computing system 222 includes a plurality of processors. For instance, Processor A 224 and Processor B 226 can be identified as the plurality of processors.

The disclosed technology can also acquire a set of media content items, such as a first image 228, a second image 230, a third image 232, and so forth. In this example scenario 220, the disclosed technology can utilize, in parallel, Processor A 224 to perform object detection (e.g., face detection) with respect to the first image 228 and Processor B 226 to perform object detection with respect to the second image 230. In some cases, if Processor A 224 completes object detection with respect to the first image 228 before Processor B 226 completes object detection with respect to the second image 230, then Processor A 224 can initiate and perform object detection with respect to the third image 232. Similarly, if Processor B 226 completes object detection with respect to the second image 230 before Processor A 224 completes object detection with respect to the first image 228, then Processor B 226 can initiate and perform object detection with respect to the third image 232. It should be appreciated that many variations associated with the disclosed technology are possible.

Figure 2C:
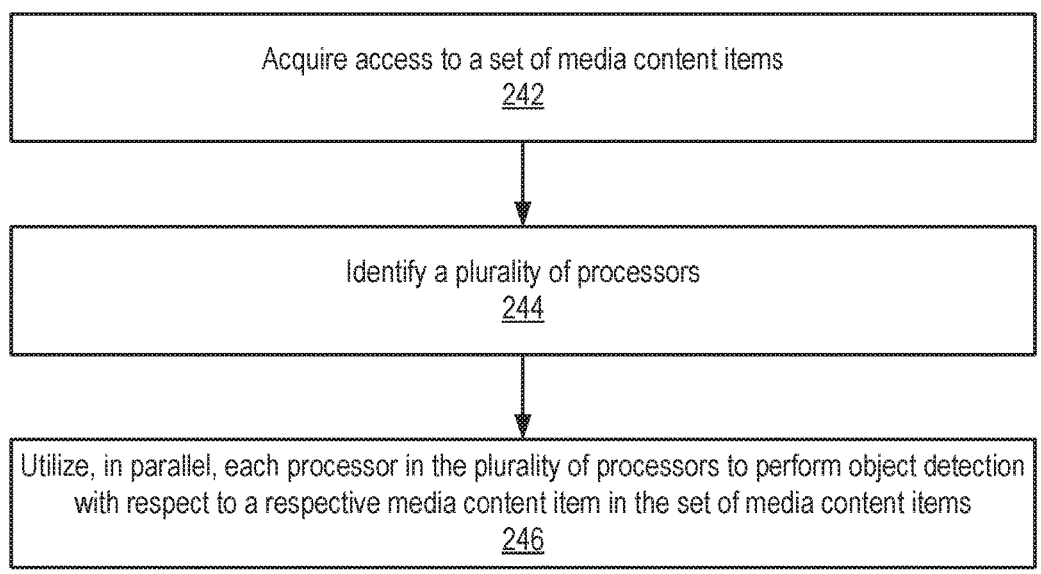
FIG. 2C illustrates an example method associated with processing media content that depict objects, according to an embodiment of the present disclosure.

FIG. 2C illustrates an example method 240 associated with processing media content that depict objects, according to an embodiment of the present disclosure. It should be appreciated that there can be additional, fewer, or alternative steps performed in similar or alternative orders, or in parallel, within the scope of the various embodiments unless otherwise stated.

At block 242, the example method 240 can acquire access to a set of media content items. At block 244, the example method 240 can identify a plurality of processors. At block 246, the example method 240 can utilize, in parallel, each processor in the plurality of processors to perform object detection with respect to a respective media content item in the set of media content items. There can be many variations or other possibilities.

Figure 3A:
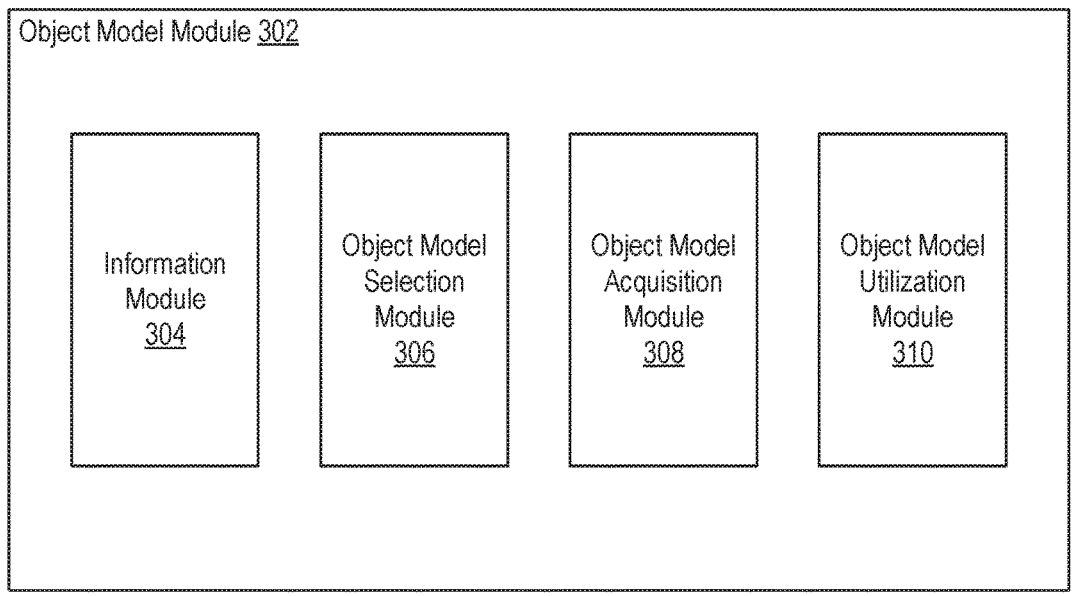
FIG. 3A illustrates an example object model module configured to facilitate processing media content that depict objects, according to an embodiment of the present disclosure.

FIG. 3A illustrates an example object model module 302 configured to facilitate processing media content that depict objects, according to an embodiment of the present disclosure. In some embodiments, the object model module 106 of FIG. 1 can be implemented as the example object model module 302. As shown in FIG. 3A, the object model module 302 can include an information module 304, an object model selection module 306, an object model acquisition module 308, and an object model utilization module 310.

In some embodiments, the object model module 302 can utilize the information module 304 to facilitate acquiring information associated with at least one of a current state of a computing system, a user of the computing system, or object popularity metrics. In some implementations, the object model module 302 can utilize the object model selection module 306 to enable the information to be utilized to select a subset of object models out of a set of object models.

In some cases, the current state of the computing system can indicate at least one of a time or a location. The subset of object models can then be selected based on at least one of the time or the location. In one instance, the subset of object models can be selected such that each object model in the subset has at least a threshold likelihood confidence value of being associated with a particular time (e.g., date, event, etc.). In this instance, if the particular time/date is New Year's Day, then the subset of object models can be selected to include objects that have at least a threshold likelihood confidence value of being associated with New Year's Day, such as objects models for champagne glasses, confetti, Times Square, etc. In another instance, the subset of object models can be selected such that each object model in the subset has at least a threshold likelihood confidence value of being associated with the location (e.g., region, landmark, place, building, local business, restaurant, etc.). Many variations are possible.

In some cases, the information associated with the user of the computing system can include historical data associated with one or more interactions performed by the user via the computing system. The subset of object models can be selected based on the historical data. For example, the subset of object models can be selected based on what the user has previously liked, shared, and/or commented upon within a social networking system. In another example, it can be determined that the user has acquired at least a specified threshold quantity of media content items that depict a particular object. It can also be determined that a particular object model for the particular object is yet to be included in the subset of object models. In this example, the particular object model can be selected for inclusion in the subset of object models.

Further, in some cases, the information associated with the user of the computing system can include social data associated with the user. The subset of object models can be selected based on the social data associated with the user. For example, the social data can indicate or identify one or more social connections that each have at least a threshold social coefficient value with respect to the user (e.g., friends within the social networking system that are sufficiently close to the user). In this example, at least some object models in the subset of object models can be selected based on one or more object models associated with the one or more social connections, such as object models that are commonly or frequently utilized by the social connections.

Moreover, in some embodiments, the subset of object models can be selected such that each object model in the subset has a respective object popularity metric that at least satisfies a specified object popularity threshold. For instance, the subset of object models can be selected to include only the top X amount of most popular or most common objects. In another instance, a respective object popularity metric, value, or score can be calculated for each object model to indicate how popular, trendy, or common each object (represented by each object model) is. In this instance, only those object models that receive a sufficiently high object popularity metric, value, or score can be selected for inclusion in the subset. Again, many variations associated with the disclosed technology are possible.

In some embodiments, the object model acquisition module 308 can acquire the subset of object models. For example, the object model acquisition module 308 can download, retrieve, or receive the subset of object models. In some instances, the set of object models can be stored remotely from the computing system, such as on one or more servers. Subsequent to being downloaded, retrieved, received, or otherwise acquired by the object model acquisition module 308, the subset of object models can be stored locally at the computing system.

Additionally, in some implementations, the object model utilization module 310 can perform object recognition, based on the subset of object models, with respect to a set of media content items, such as images acquired by the computing system. In some cases, each object model in the set of object models can have been trained for utilization during object recognition to identify a respective object with which each object model is associated. Moreover, in some embodiments, performing object recognition, based on the subset of object models, with respect to the set of media content items can occur locally at the computing system. Again, there can be many variations or other possibilities associated with the disclosed technology. For instance, in some cases, the disclosed technology can enable media content items to be locally and/or remotely searchable based on topics, object names, and/or object categories.

Figure 3B:
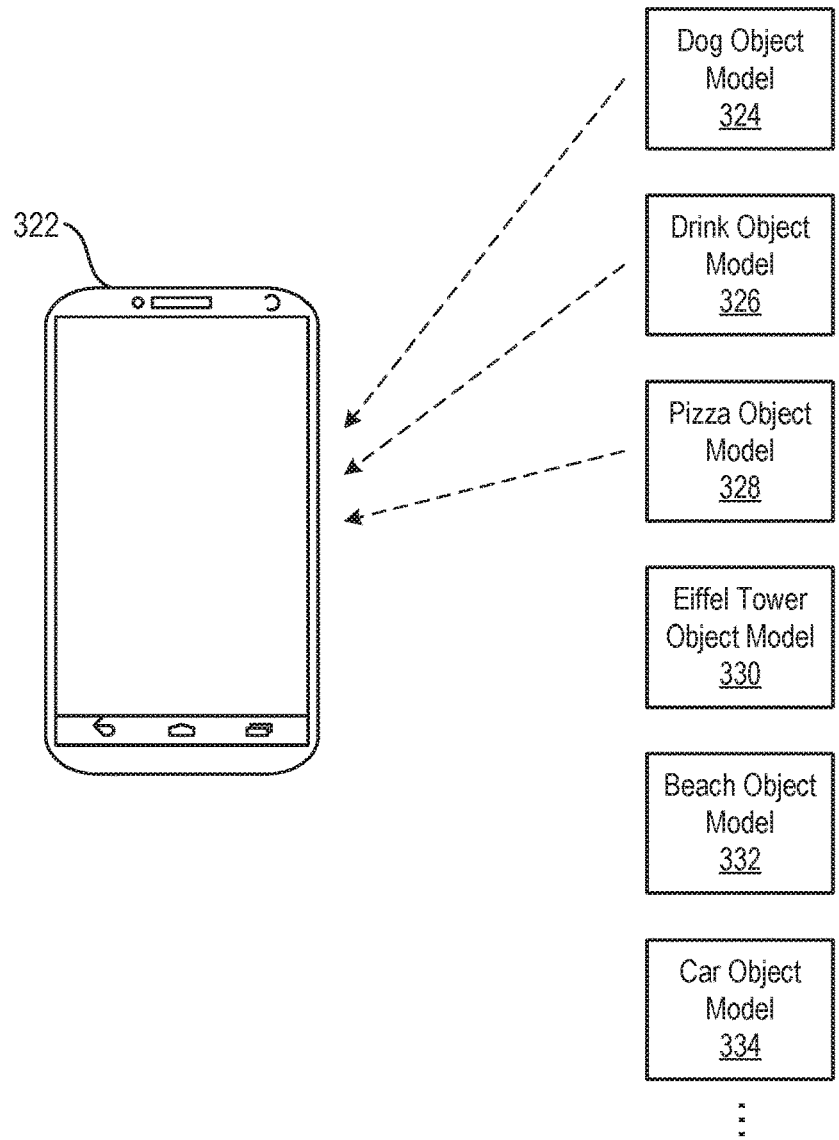
FIG. 3B illustrates an example scenario associated with processing media content that depict objects, according to an embodiment of the present disclosure.

FIG. 3B illustrates an example scenario 320 associated with processing media content that depict objects, according to an embodiment of the present disclosure. The example scenario 320 illustrates an example computing system (or device) 322 and a set of object models, such as a dog object model 324, a drink object model 326, a pizza object model 328, an Eiffel tower object model 330, a beach object model 332, a car object model 334, and so forth.

In the example scenario 320, the disclosed technology can select a subset of object models, out of the set of object models, that are most popular, common, and/or trendy. In this example, the subset of object models can include, for instance, the dog object model 324, the drink object model 326, and the pizza object model 328. The subset of object models can be downloaded/acquired and stored locally at the computing system 322. As such, object recognition based on the subset of object models can be performed locally at computing system 322, thus improving media processing efficiency.

In one instance, the computing system 322 can determine that it is located in Paris, France. As such, the disclosed technology can incorporate, into the subset of object models, object models associated with Paris. In this instance, the Eiffel Tower object model 330 can be added to the subset, downloaded/acquired, and stored locally at the computing system 322. As discussed, many variations are possible.

Figure 3C:
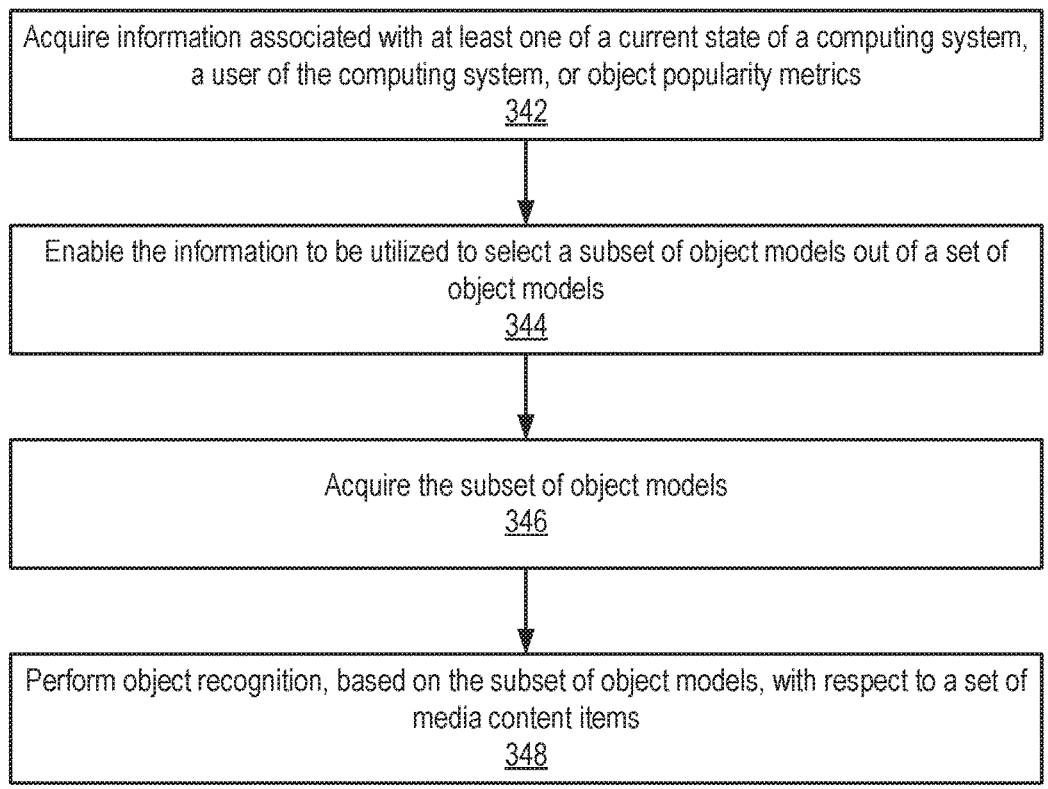
FIG. 3C illustrates an example method associated with processing media content that depict objects, according to an embodiment of the present disclosure.

FIG. 3C illustrates an example method 340 associated with processing media content that depict objects, according to an embodiment of the present disclosure. As discussed, it should be understood that there can be additional, fewer, or alternative steps performed in similar or alternative orders, or in parallel, within the scope of the various embodiments unless otherwise stated.

At block 342, the example method 340 can acquire information associated with at least one of a current state of a computing system, a user of the computing system, or object popularity metrics. At block 344, the example method 340 can enable the information to be utilized to select a subset of object models out of a set of object models. At block 346, the example method 340 can acquire the subset of object models. At block 348, the example method 340 can perform object recognition, based on the subset of object models, with respect to a set of media content items.

Figure 4A:
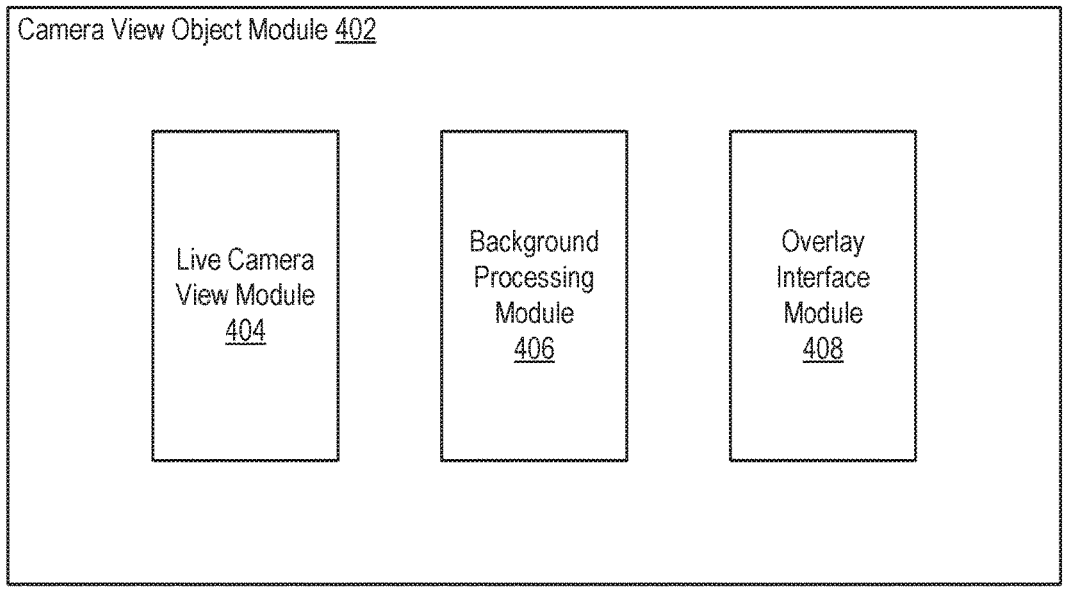
FIG. 4A illustrates an example camera view object module configured to facilitate processing media content that depict objects, according to an embodiment of the present disclosure.

FIG. 4A illustrates an example camera view object module 402 configured to facilitate processing media content that depict objects, according to an embodiment of the present disclosure. In some embodiments, the camera view object module 108 of FIG. 1 can be implemented as the example camera view object module 402. As shown in FIG. 4A, the camera view object module 402 can include a live camera view module 404, a background processing module 406, and an overlay interface module 408.

In some implementations, the camera view object module 402 can utilize the live camera view module 404 to facilitate providing a live camera view for a camera of a computing system. For example, the live camera view can correspond to a viewfinder display feed for the camera such that the live camera view presents in real-time (or near real-time) what the lens of the camera perceives or senses. In some cases, the live camera view can be associated with a default camera application of the computing system.

Moreover, in some embodiments, the camera view object module 402 can utilize the background processing module 406 to facilitate performing, as one or more background processes, object recognition with respect to one or more representations of the live camera view. As such, the background processing module 406 can also facilitate identifying, detecting, and/or recognizing (via object recognition) at least one object depicted in the one or more representations of the live camera view. The one or more representations can, in some cases, include one or more images represented via the live camera view at one or more different times. For example, the one or more representations of the live camera view can correspond to one or more video image frames of the live camera view. In some embodiments, the one or more representations can be acquired for each frame of the live camera view. In some implementations, the one or more representations can be acquired periodically, such as for every few frames of the live camera view. Many variations are possible.

Additionally, in some embodiments, the camera view object module 402 can utilize the overlay interface module 408 to facilitate presenting an interface portion overlaying the live camera view. The overlay interface module 408 can cause the interface portion to provide at least one label for the at least one object. The at least one label can be generated or acquired based on the identification, detection, and/or recognition of the at least one object depicted in the one or more representations of the live camera view. For instance, the at least one object can correspond to a face (i.e., a face object) of a recognized user and the at least one label can correspond to a name of the recognized user.

In one example, the camera view object module 402 can utilize the live camera view module 404 to detect, acquire, or receive a first command (e.g., a user command) to acquire, record, or capture a first image represented via the live camera view at a first time. The at least one object can be depicted in the first image. The background processing module 406 can utilize an object recognition process (e.g., a face recognition algorithm) to determine that the at least one object includes a first face associated with a first recognized user. The overlay interface module 408 can cause the at least one label to include a first identifier for the first recognized user, such as the name of the first recognized user. The background processing module 406 can also store the at least one label as metadata for the first image. An option to share the first image with the first recognized user can be provided via the overlaid interface portion provided by the overlay interface module 408.

Continuing with the previous example, the live camera view module 404 can receive a second command to acquire a second image represented via the live camera view at a second time. The background processing module 406 can determine that a second face associated with a second recognized user is depicted in the second image. The overlay interface module 408 can provide, via the interface portion, a second identifier for the second recognized user. In some cases, the camera view object module 402 can also determine that the first time and the second time are within a specified allowable time deviation from each other. The overlay interface module 408 can then provide an option that enables both the first image and the second image to be shared with both the first recognized user and the second recognized user.

In another example, the camera view object module 402 can identify, such as via metadata for the first image, a first location associated with the first image. A second location associated with the second image can also be identified, such as via metadata for the second image. The first location can indicate where the first image was captured or taken, and the second location can indicate where the second image was captured or taken. It can be determined that the first location and the second location are within a specified allowable proximity from each other. Then both the first image and the second image can be enabled to be shared with both the first recognized user and the second recognized user.

In some embodiments, the overlay interface module 408 can cause the overlaid interface portion to provide an option to edit the at least one label for the at least one object. In some implementations, the overlay interface module 408 can also cause the overlaid interface portion to provide an option to hide the at least one label for the at least one object. Moreover, in some instances, the at least one label can be dynamically provided in (or near) real-time via the interface portion. It is contemplated that there can be many variations or other possibilities associated with the disclosed technology.

Figure 4B:
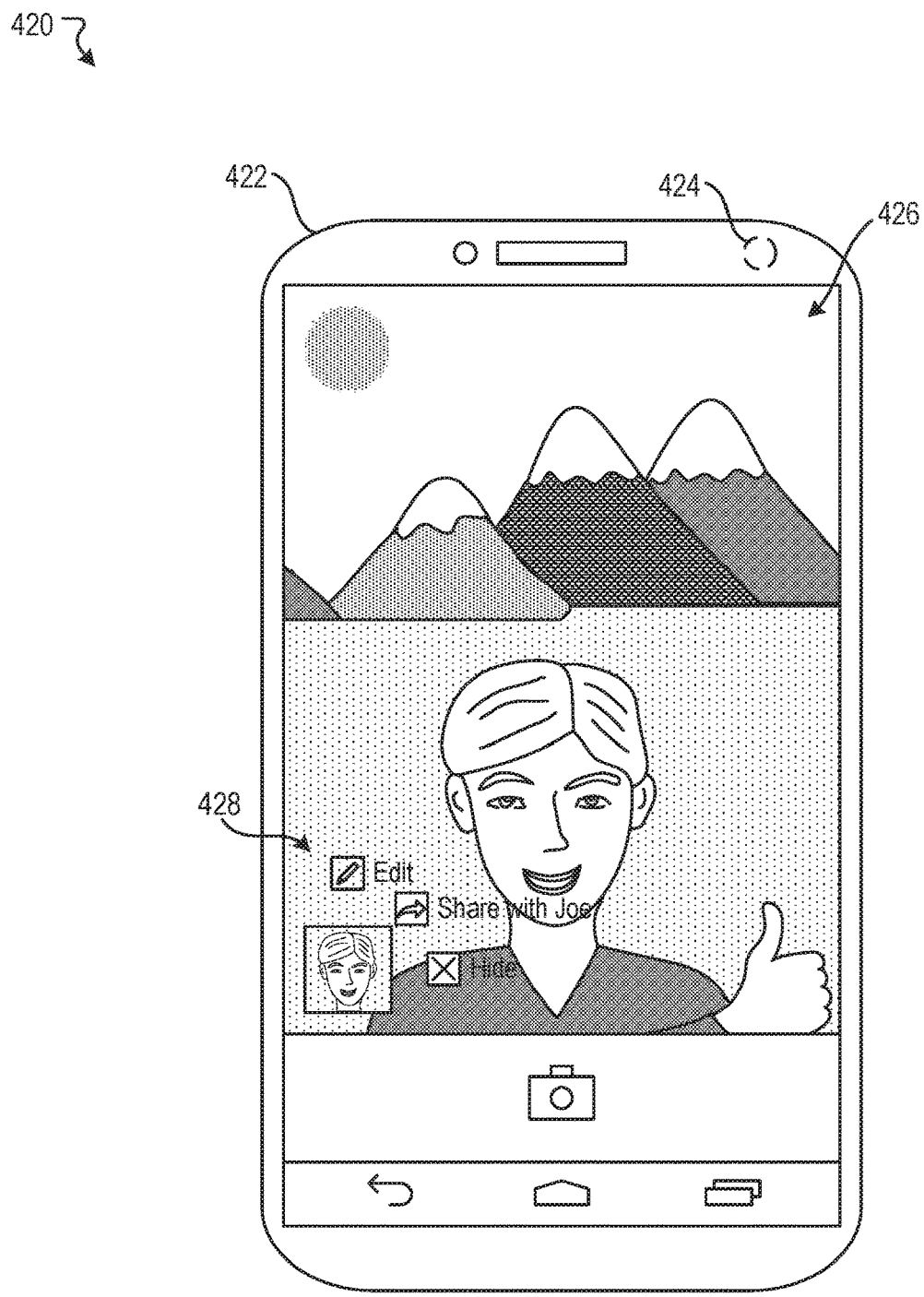
FIG. 4B illustrates an example scenario associated with processing media content that depict objects, according to an embodiment of the present disclosure.

FIG. 4B illustrates an example scenario 420 associated with processing media content that depict objects, according to an embodiment of the present disclosure. The example scenario 420 illustrates an example computing system (or device) 422. The computing system 422 can provide a live camera view 426 of a camera 424 of the computing system 422. The live camera view 426 can display a real-time (or near real-time) feed showing what the lens of the camera 424 perceives or senses.

In the example scenario 420, the disclosed technology can perform, as one or more background processes, object recognition with respect to one or more representations of the live camera view 426. In this example, a face (i.e., a face object) associated with Joe Schmoe is depicted in the one or more representations of the live camera view 426. The disclosed technology can identify or recognize, such as via the one or more background processes, Joe's face depicted in the one or more representations of the live camera view 426. The disclosed technology can present an interface portion 428 that overlays the live camera view 426. The overlaid interface portion 428 can provide a label for Joe's face, such as a name for Joe Schmoe. In this example, the label ("Joe") can be provided via an option to share, with Joe Schmoe, a captured image represented in the live camera view 426, which depicts Joe's face. Again, it should be appreciated that many variations associated with the disclosed technology are possible.

Figure 4C:
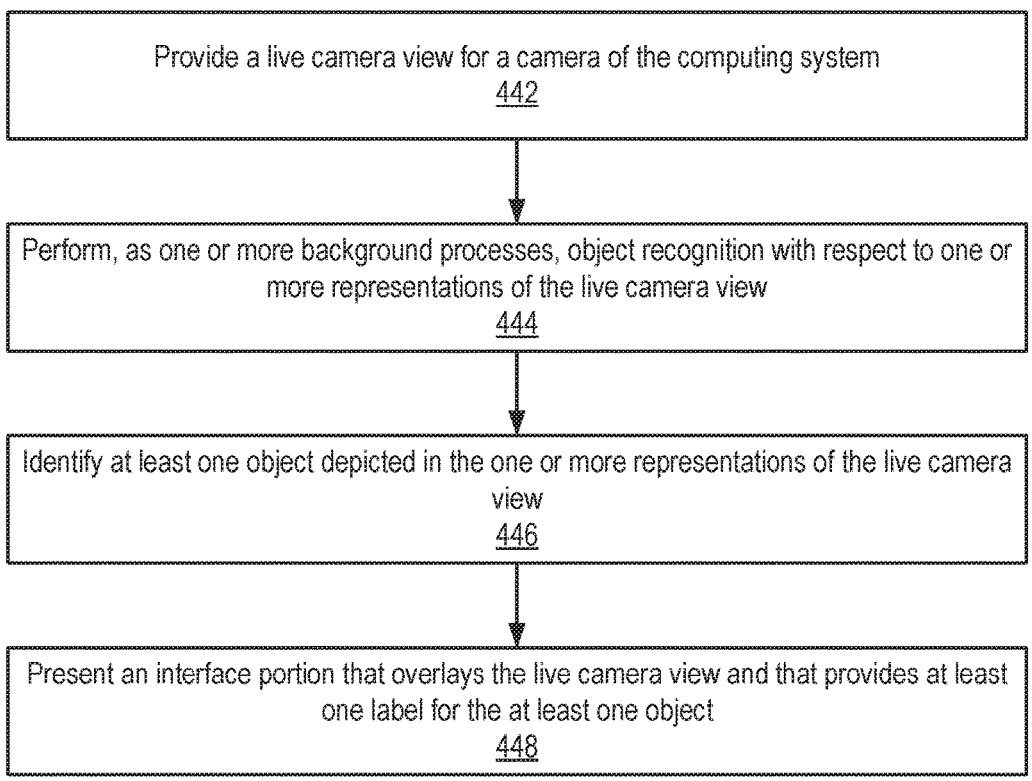
FIG. 4C illustrates an example method associated with processing media content that depict objects, according to an embodiment of the present disclosure.

FIG. 4C illustrates an example method 440 associated with processing media content that depict objects, according to an embodiment of the present disclosure. It should be appreciated that there can be additional, fewer, or alternative steps performed in similar or alternative orders, or in parallel, within the scope of the various embodiments unless otherwise stated.

At block 442, the example method 440 can provide a live camera view for a camera of a computing system. At block 444, the example method 440 can perform, as one or more background processes, object recognition with respect to one or more representations of the live camera view. At block 446, the example method 440 can identify at least one object depicted in the one or more representations of the live camera view. At block 448, the example method 440 can present an interface portion overlaying the live camera view. The interface portion can provide at least one label for the at least one object. Many variations are possible.

Figure 5A:
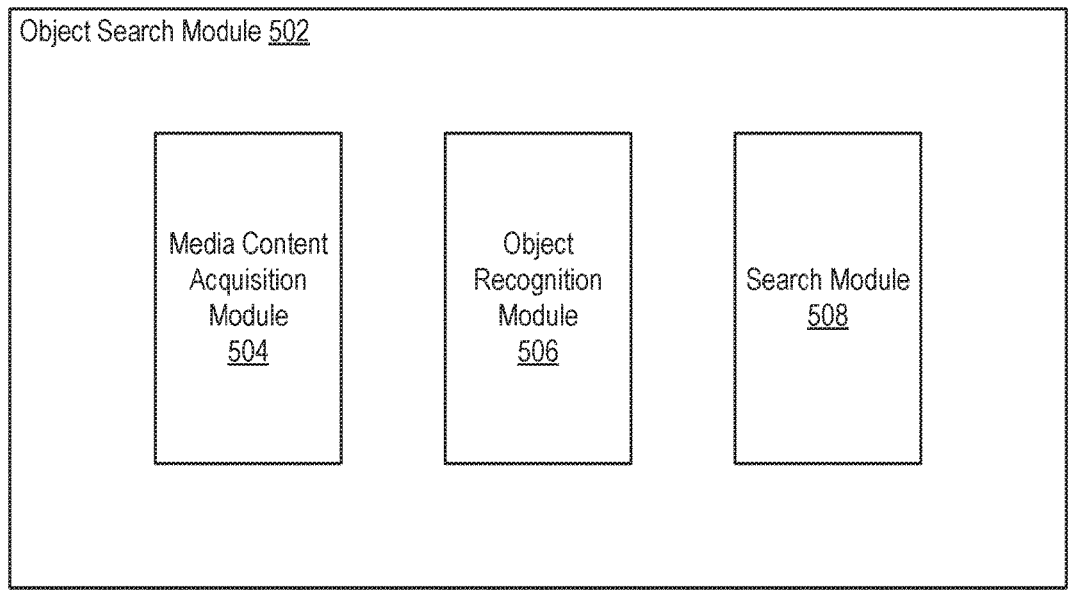
FIG. 5A illustrates an example object search module configured to facilitate processing media content that depict objects, according to an embodiment of the present disclosure.

FIG. 5A illustrates an example object search module 502 configured to facilitate processing media content that depict objects, according to an embodiment of the present disclosure. In some embodiments, the object search module 110 of FIG. 1 can be implemented as the example object search module 502. As shown in FIG. 5A, the object search module 502 can include a media content acquisition module 504, an object recognition module 506, and a search module 508.

The object search module 502 can utilize the media content acquisition module 504 to facilitate acquiring access to a set of media content items. In some embodiments, the media content acquisition module 504 can be implemented as, can reside within, can be operable with, and/or can function similar to the media content acquisition module 204 of FIG. 2A. In some instances, the media content acquisition module 504 of FIG. 5A can retrieve, receive, or otherwise acquire (access to) at least some media content items that are stored locally at a computing system. For example, the at least some media content items stored locally can include one or more images from a local image collection (e.g., camera roll) at the computing system. In some instances, the media content acquisition module 504 can retrieve, receive, or otherwise acquire (access to) at least some media content items that are stored remotely from the computing system. The at least some media content items can, for example, include one or more images stored at one or more servers (e.g., one or more cloud servers) remote from the computing system.

In some implementations, the object search module 502 can utilize the object recognition module 506 to enable object recognition to be performed with respect to the set of media content items to identify at least one object depicted in at least one media content item out of the set of media content items. Object detection, object recognition, and/or image classification processes are discussed above in more detail. In one example, object recognition can be performed, locally at the computing system, with respect to at least some media content items in the set of media content items. In another example, the object recognition can be performed, remotely from the computing system, with respect to at least some media content items in the set of media content items. The object recognition module 506 can also associate, based on identifying or recognizing the at least one object, at least one label with the at least one media content item. For instance, the at least one label can correspond to at least one of an identifier, a topic, or a classification for the at least one object.

Moreover, in some embodiments, the object search module 502 can utilize the search module 508 to enable, based on an input (e.g., a user search query) indicating the at least one label, a search through the set of media content items to identify a subset of media content items that depict the at least one object. In one instance, at least some media content items in the subset of media content items have already been previously recognized and become associated with the at least one label. As such, these media content items can be identified based on the search. Additionally, in some cases, at least some media content items in the set of media content items can have already been manually labeled, such as being manually tagged. Accordingly, if the input includes a particular manual tag or label, media content items that have the particular manual tag or label can be included in the search results. Many variations are possible.

In one example, at least some media content items in the set of media content items can be stored locally at the computing system. The search module 508 can cause the search through the set to be performed, at least in part, locally at the computing system. In another example, at least some media content items in the set can be stored remotely from the computing system. The search module 508 can cause the search through the set of media content items to be performed, at least in part, remotely from the computing system, such as via one or more servers.

Furthermore, in some cases, the object search module 502 can provide a user associated with the input (e.g., a user who entered the input) with access to the subset of media content items that depict the at least one object. The object search module 502 can also ensure that the user associated with the input indeed has permission to access the set of media content items. It is contemplated that the disclosed technology can, for instance, ensure that various privacy settings, preferences, and configurations are maintained and can prevent private information from being divulged. As discussed previously, there can be many variations or other possibilities associated with the disclosed technology.

Figure 5B:
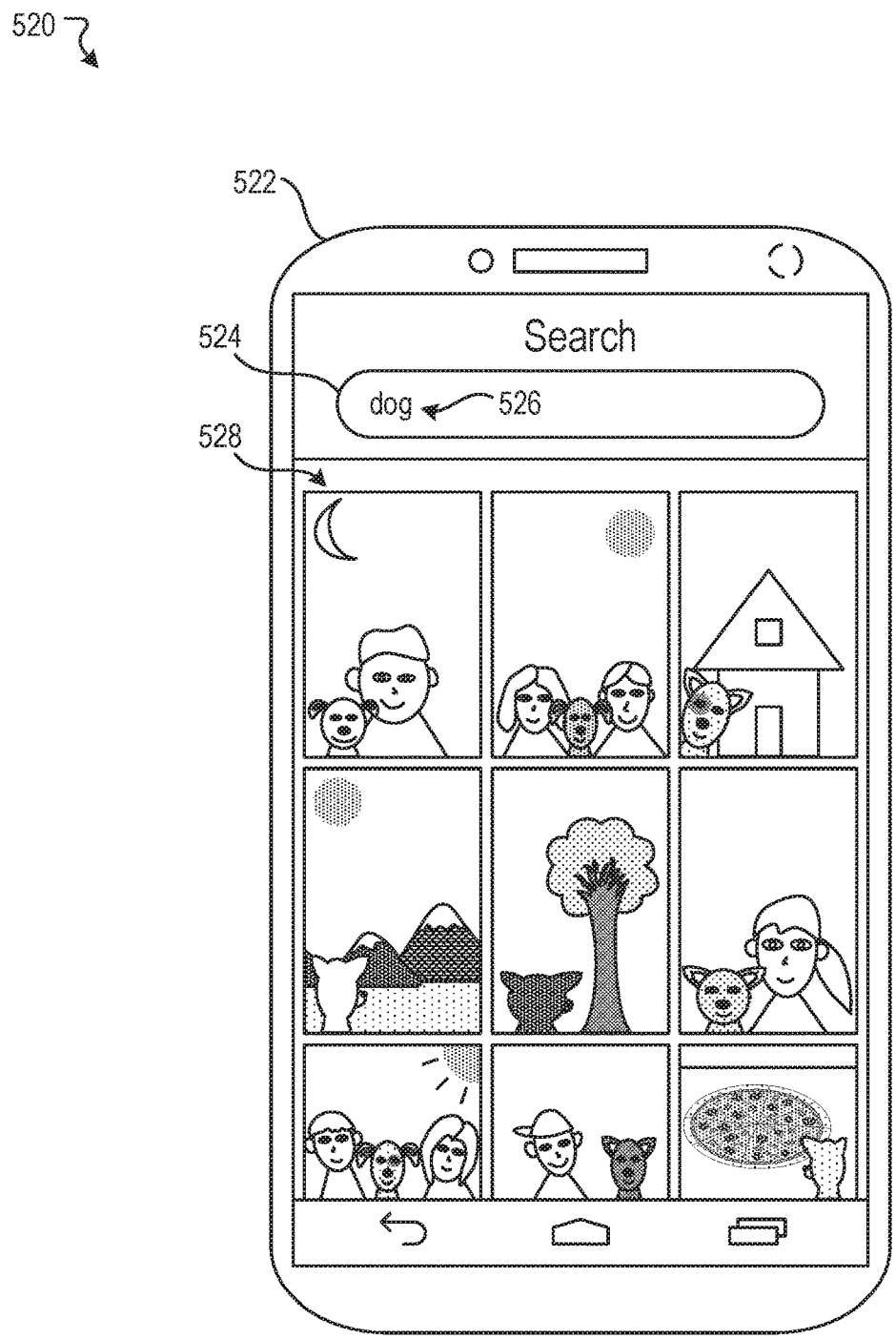
FIG. 5B illustrates an example scenario associated with processing media content that depict objects, according to an embodiment of the present disclosure.

FIG. 5B illustrates an example scenario 520 associated with processing media content that depict objects, according to an embodiment of the present disclosure. The example scenario 520 illustrates an example computing system (or device) 522.

In some embodiments, the disclosed technology can enable a search through a set of media content items in order to identify a subset of media content items that depict a particular object. For instance, the particular object can be associated with a particular label such that a search based on the particular label inputted as a search query can locate or find media content items that depict the particular object. As shown in the example scenario 520, the disclosed technology can cause the computing system 522 to provide an object search tool 524. A user can input a label ("dog") 526 into the object search tool 524 to perform a search through a set of already labeled or tagged images in order to identify a subset 528 of images that depict dogs. Again, many variations are possible.

Figure 5C:
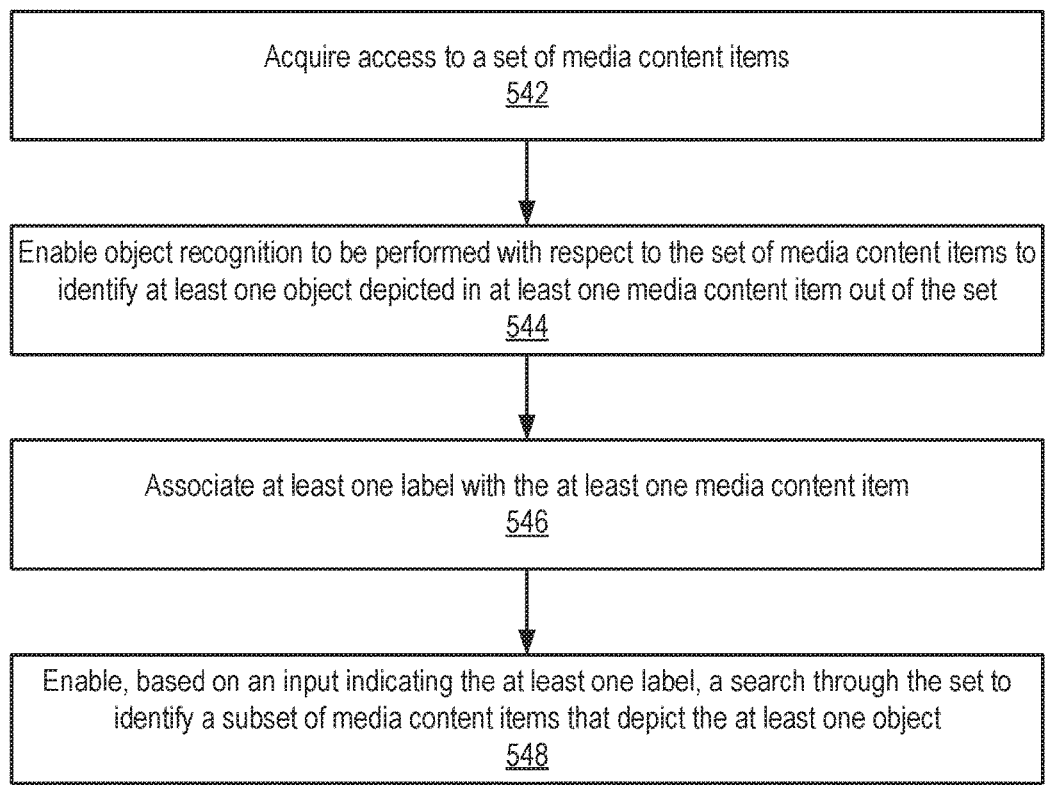
FIG. 5C illustrates an example method associated with processing media content that depict objects, according to an embodiment of the present disclosure.

FIG. 5C illustrates an example method 540 associated with processing media content that depict objects, according to an embodiment of the present disclosure. As discussed, it should be understood that there can be additional, fewer, or alternative steps performed in similar or alternative orders, or in parallel, within the scope of the various embodiments unless otherwise stated.

At block 542, the example method 540 can acquire access to a set of media content items. At block 544, the example method 540 can enable object recognition to be performed with respect to the set of media content items to identify at least one object depicted in at least one media content item out of the set of media content items. At block 546, the example method 540 can associate at least one label with the at least one media content item. The at least one label can correspond to at least one of an identifier, a topic, or a classification for the at least one object. At block 548, the example method 540 can enable, based on an input indicating the at least one label, a search through the set of media content items to identify a subset of media content items that depict the at least one object.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
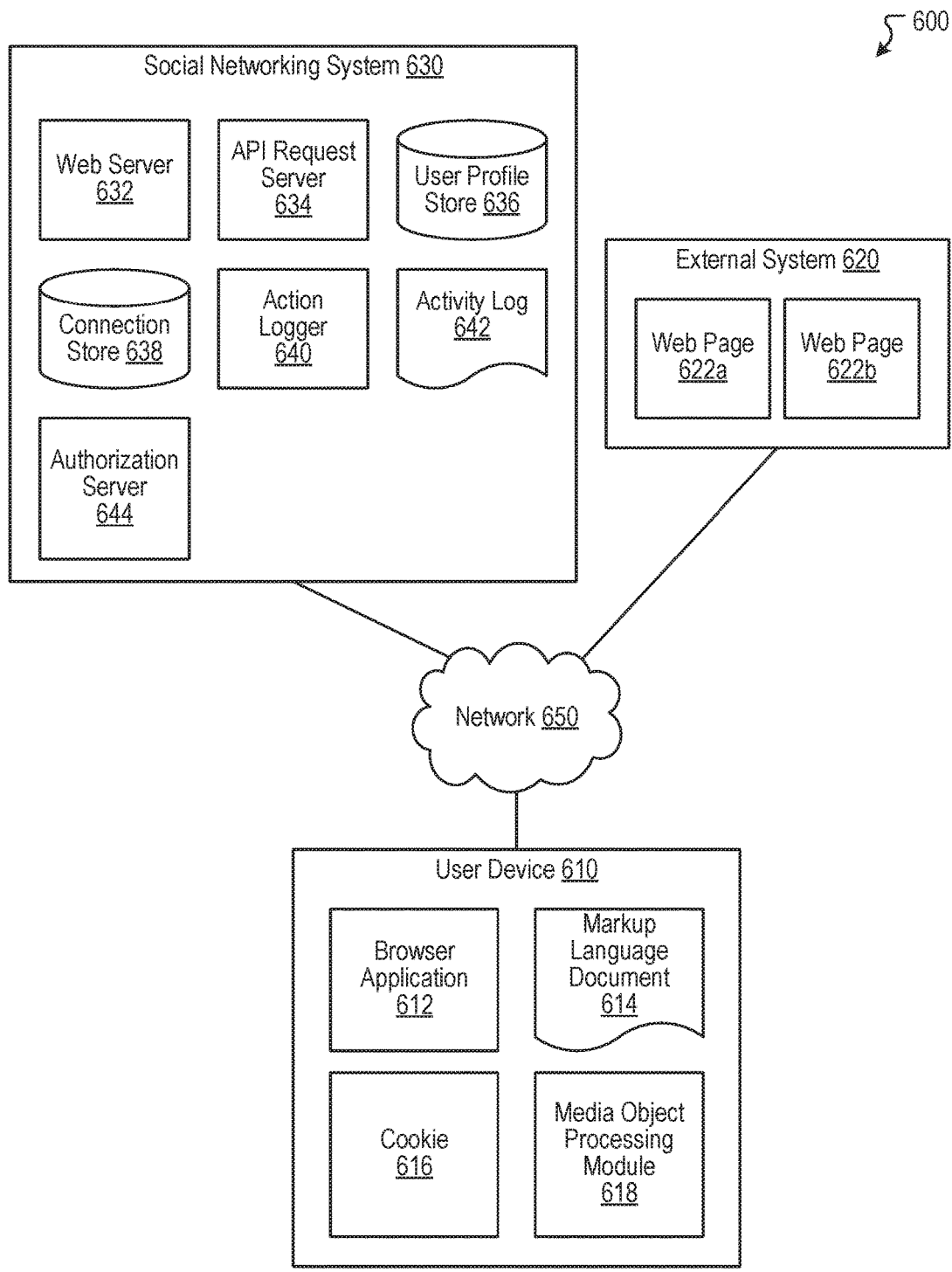
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a media object processing module 618. The media object processing module 618 can, for example, be implemented as the media object processing module 102 of FIG. 1. As discussed previously, it should be appreciated that there can be many variations or other possibilities. For example, in some instances, the media object processing module (or at least a portion thereof) can be included or implemented in the social networking system 630. Other features of the media object processing module 618 are discussed herein in connection with the media object processing module 102.

Hardware Implementation

Figure 7:
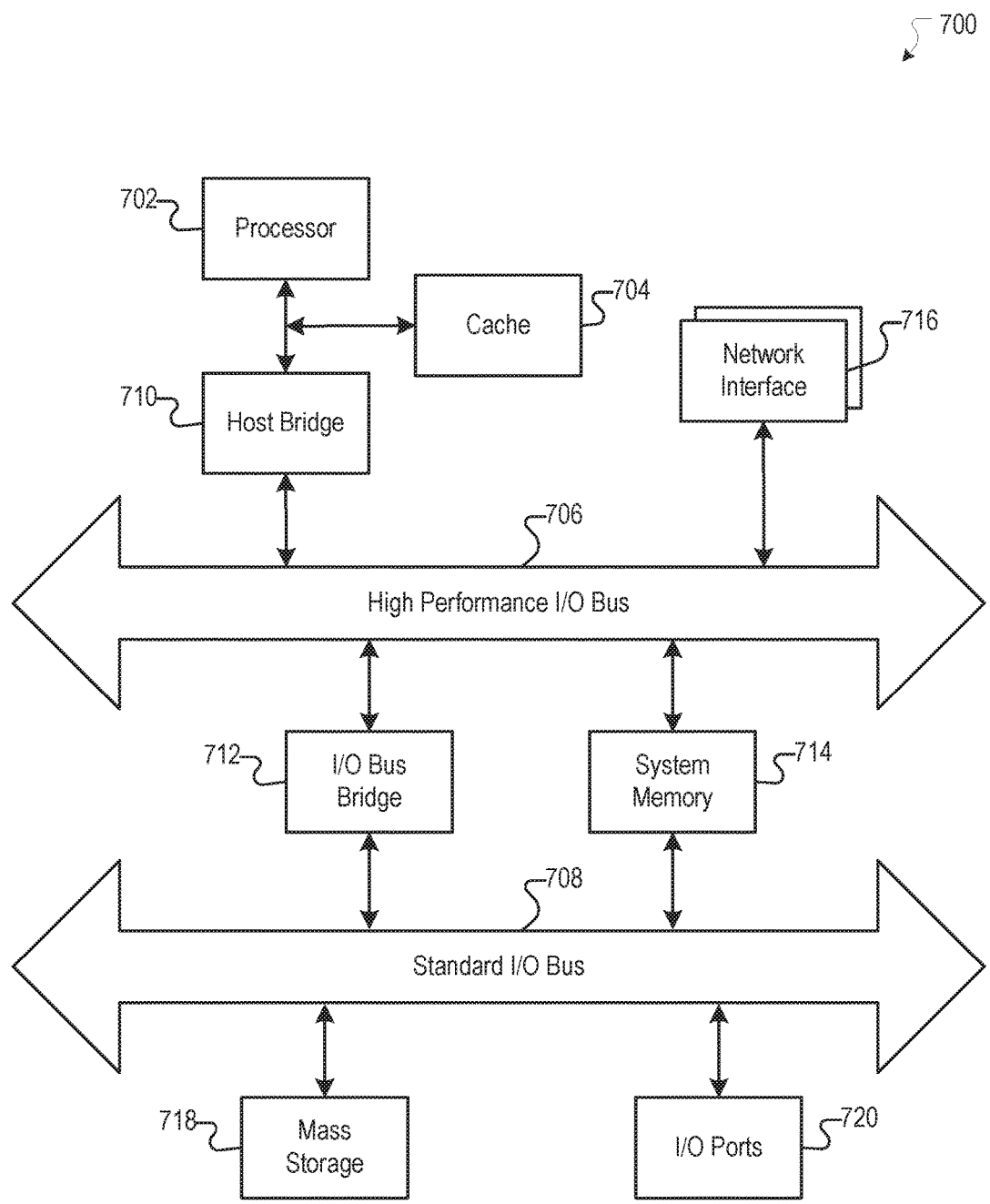
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, by a computing system, a live camera view for a camera of the computing system;
    performing, by the computing system, as one or more background processes, object recognition with respect to one or more representations of the live camera view;
    receiving, by the computing system, a first command to acquire a first image represented via the live camera view at a first time,
    determining, by the computing system, that a first face associated with a first recognized user is depicted in the first image; and
    identifying, by the computing system, a first location associated with the first image;
    receiving, by the computing system, a second command to acquire a second image represented via the live camera view at a second time;
    determining, by the computing system, that a second face associated with a second recognized user is depicted in the second image;
    identifying, by the computing system, a second location associated with the second image;
    determining, by the computing system, that the first location and the second location are within a specified allowable proximity from each other;
    presenting, by the computing system, an interface portion overlaying the live camera view, the interface portion providing at least a first identifier for the first recognized user in the first image; and
    enabling, by the computing system, both the first image and the second image to be shared with both the first recognized user and the second recognized user.

2. The computer-implemented method of claim 1, further comprising:
    providing an option to share the first image with the first recognized user via the interface portion.

3. The computer-implemented method of claim 1, further comprising:
    determining that the first time and the second time are within a specified allowable time deviation from each other; and
    enabling both the first image and the second image to be shared with both the first recognized user and the second recognized user.

4. The computer-implemented method of claim 1, further comprising:
    providing an option to edit the first identifier for the first recognized user in the first image.

5. The computer-implemented method of claim 1, further comprising:
    providing an option to hide the first identifier for the first recognized user in the first image.

6. The computer-implemented method of claim 1, wherein the first identifier is dynamically provided in real-time via the interface portion.

7. The computer-implemented method of claim 1, wherein the one or more representations include one or more images represented via the live camera view at one or more different times.

8. The computer-implemented method of claim 1, wherein the live camera view is associated with a default camera application.

9. A system comprising:
at least one processor; and
a memory storing instructions that, when executed by the at least one processor, cause the system to perform:
providing a live camera view for a camera of the system;
performing, as one or more background processes, object recognition with respect to one or more representations of the live camera view;
receiving a first command to acquire a first image represented via the live camera view at a first time,
determining that a first face associated with a first recognized user is depicted in the first image; and
identifying a first location associated with the first image;
receiving a second command to acquire a second image represented via the live camera view at a second time;
determining that a second face associated with a second recognized user is depicted in the second image;
identifying a second location associated with the second image;
determining that the first location and the second location are within a specified allowable proximity from each other;
presenting an interface portion overlaying the live camera view, the interface portion providing at least a first identifier for the first recognized user in the first image; and
enabling both the first image and the second image to be shared with both the first recognized user and the second recognized user.

10. The system of claim 9, wherein the instructions cause the system to further perform:
providing an option to share the first image with the first recognized user via the interface portion.

11. The system of claim 9, wherein the instructions cause the system to further perform:
determining that the first time and the second time are within a specified allowable time deviation from each other; and
enabling both the first image and the second image to be shared with both the first recognized user and the second recognized user.

12. The system of claim 9, wherein the instructions cause the system to further perform:
providing an option to edit the first identifier for the first recognized user in the first image.

13. The system of claim 9, wherein the instructions cause the system to further perform:
providing an option to hide the first identifier for the first recognized user in the first image.

14. The system of claim 9, wherein the first identifier is dynamically provided in real-time via the interface portion.

15. A non-transitory computer-readable storage medium including instructions that, when executed by at least one processor of a computing system, cause the computing system to perform a method comprising:
providing a live camera view for a camera of the computing system;
performing, as one or more background processes, object recognition with respect to one or more representations of the live camera view;
receiving a first command to acquire a first image represented via the live camera view at a first time,
determining that a first face associated with a first recognized user is depicted in the first image; and
identifying a first location associated with the first image;
receiving a second command to acquire a second image represented via the live camera view at a second time;
determining that a second face associated with a second recognized user is depicted in the second image;
identifying a second location associated with the second image;
determining that the first location and the second location are within a specified allowable proximity from each other;
presenting an interface portion overlaying the live camera view, the interface portion providing at least a first identifier for the first recognized user in the first image; and
enabling both the first image and the second image to be shared with both the first recognized user and the second recognized user.

16. The non-transitory computer-readable storage medium of claim 15, wherein the instructions cause the computing system to further perform:
providing an option to share the first image with the first recognized user via the interface portion.

17. The non-transitory computer-readable storage medium of claim 15, wherein the instructions cause the computing system to further perform:
determining that the first time and the second time are within a specified allowable time deviation from each other; and
enabling both the first image and the second image to be shared with both the first recognized user and the second recognized user.

18. The non-transitory computer-readable storage medium of claim 15, wherein the instructions cause the computing system to further perform:
providing an option to edit the first identifier for the first recognized user in the first image.

19. The non-transitory computer-readable storage medium of claim 15, wherein the instructions cause the computing system to further perform:
providing an option to hide the first identifier for the first recognized user in the first image.

20. The non-transitory computer-readable storage medium of claim 15, wherein the first identifier is dynamically provided in real-time via the interface portion.

* * * * *